Patented May 30, 1939

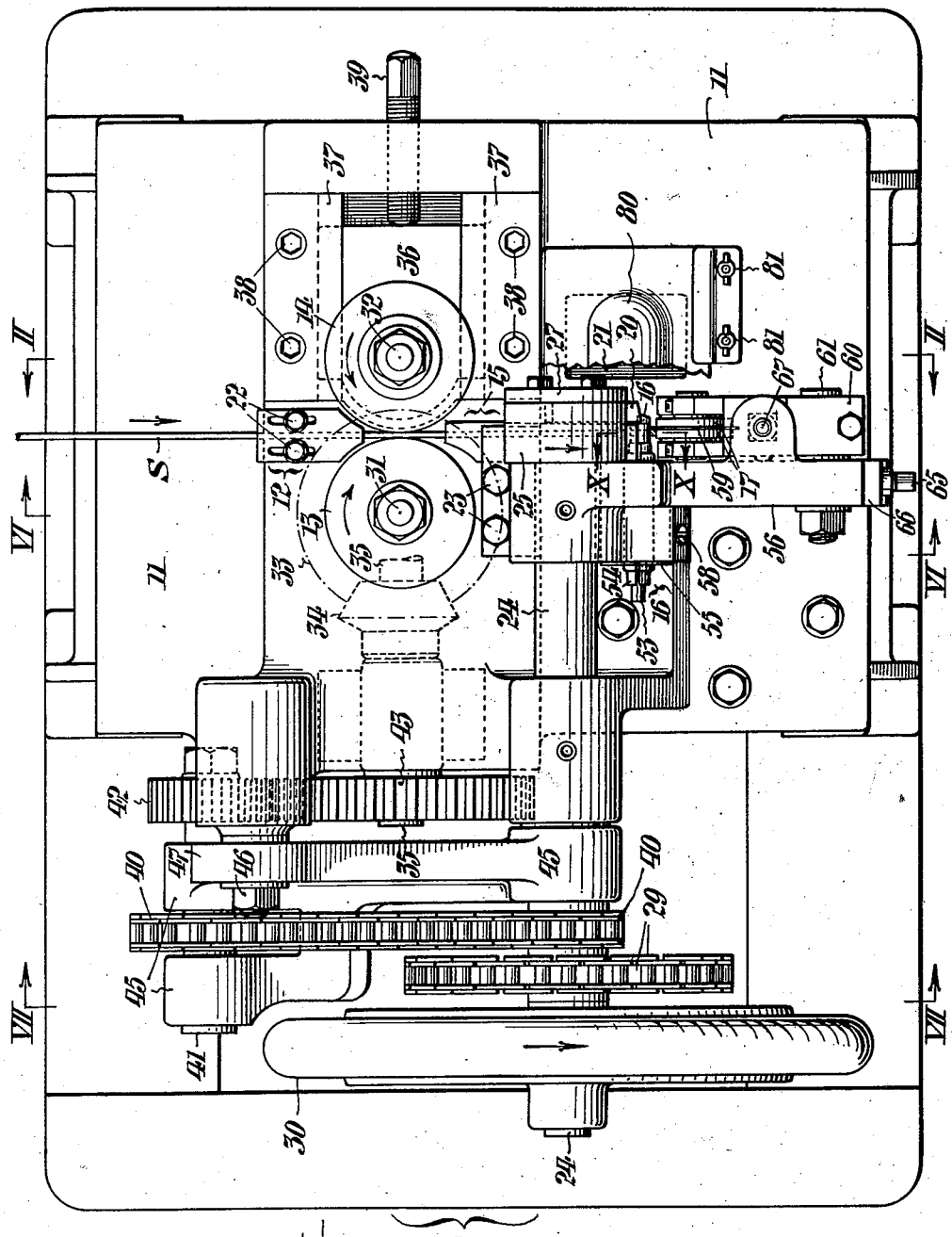

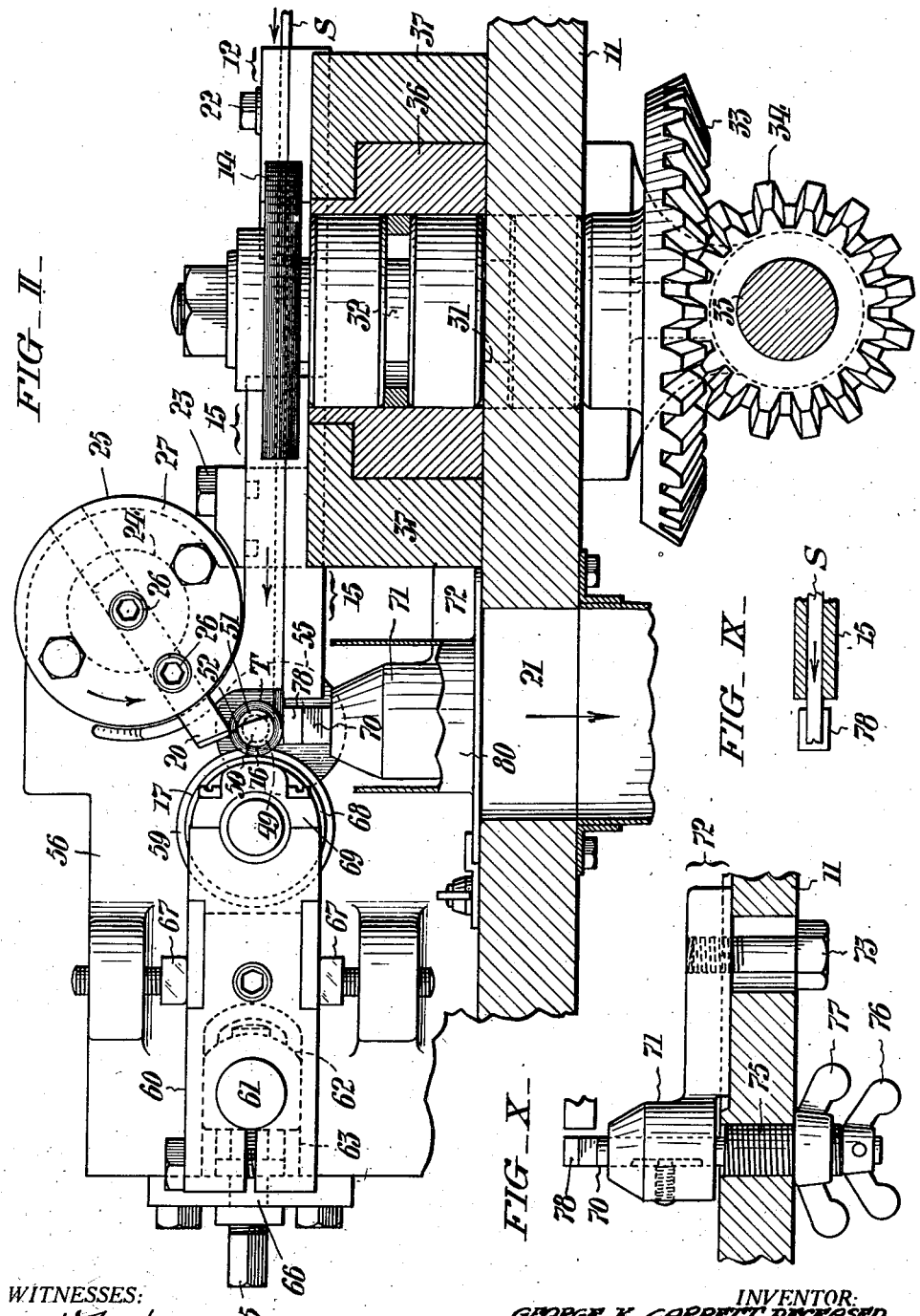

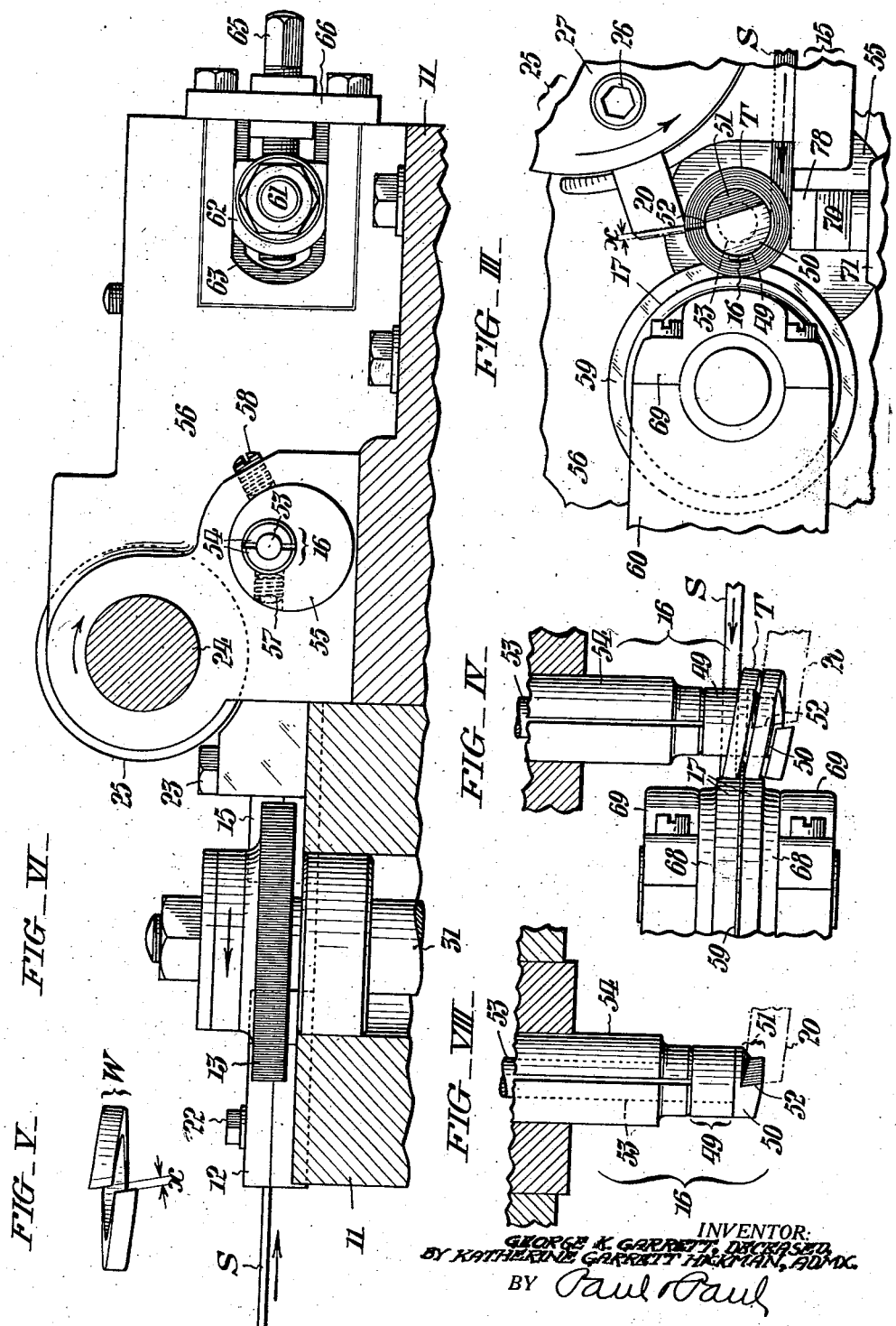

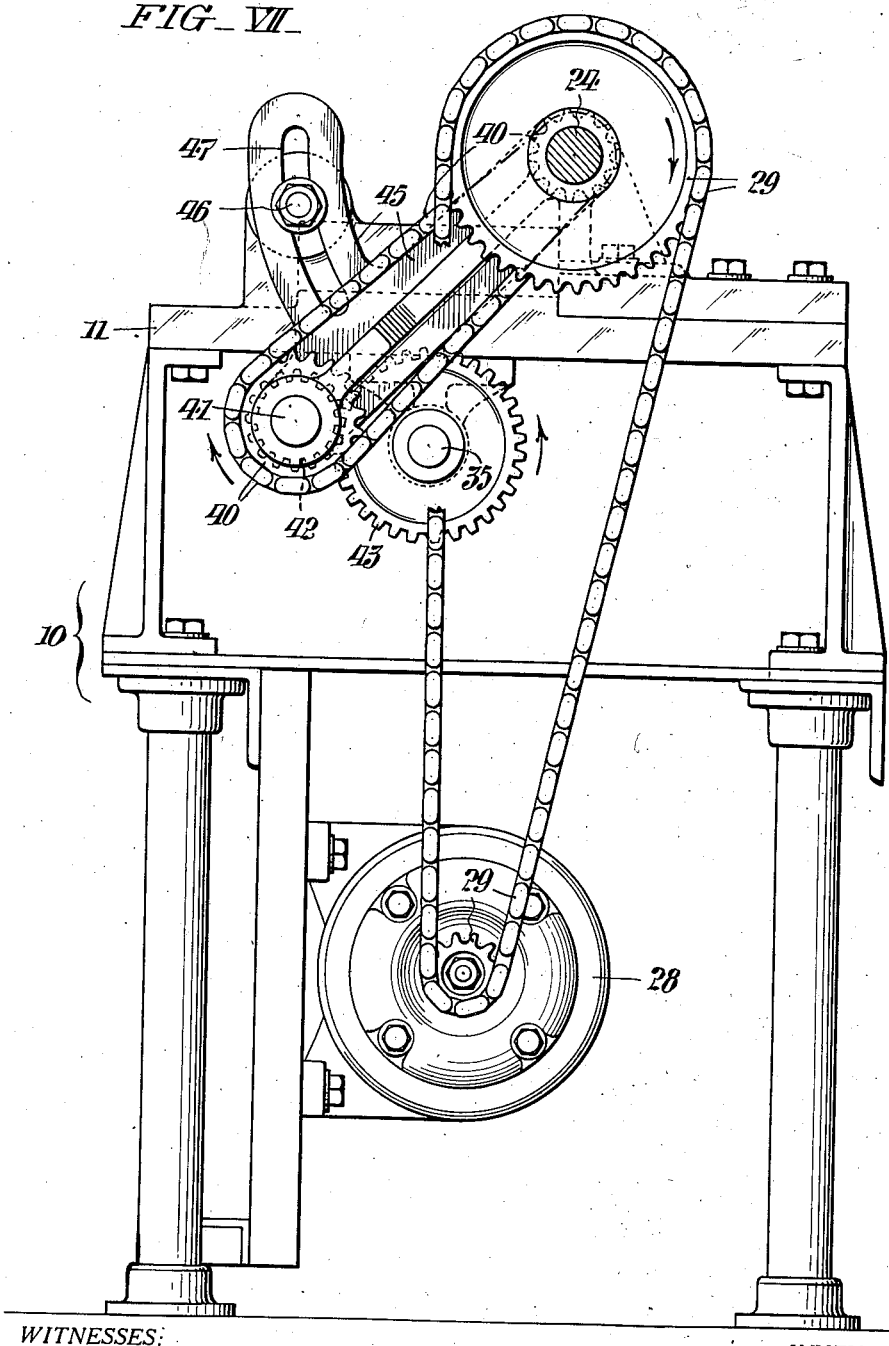

2,160,497

UNITED STATES PATENT OFFICE 2,160,497

MACHINERY FOR MAKING CIRCULAR AND COILED ARTICLES

George K. Garrett, deceased, late of Bryn Mawr, Pa., by Katherine Garrett Hickman, administratrix, Bryn Mawr, Pa.

Application October 16, 1937, Serial No. 169,419

6 Claims. (Cl. 10—73)

This invention relates to the manufacture of circular or coiled articles such as rings, washers and the like, and especially split resilient lock washers. An important object of the invention is to produce such articles more rapidly, and to permit easier and quicker set-up or adjustment of the machine for each particular job, according to the form and dimensions of the devices to be produced. The invention involves various improvements in machinery for making such articles, which will appear from the following description of one species or form of embodiment, and from the drawings. This form of machine is hereinafter explained with particular reference to washers with ridges on their sides, extending across the annular surface (or radially) on one side, and around the annular surface (or circumferentially) on the other side,—such as shown in U. S. Patent No. 2,014,231, granted to George K. Garrett on September 10, 1935. So far as novel over the prior art, all of the features and combinations shown or described are of the invention.

In the drawings, Fig. I is a plan view of a machine embodying the invention.

Fig. II shows a vertical sectional view of the machine parallel with the line of stock infeed, taken as indicated by the line and arrows II—II in Fig. I, and regarded from the front of the machine, which is at the right of Fig. I.

Fig. III is a fragmentary view similar to a portion of Fig. II, but on a larger scale, illustrating the final cutting off of a completed washer from the wire or bar stock of which it is made.

Fig. IV is a fragmentary plan view illustrating the same operation as Fig. III, with a part in horizontal section.

Fig. V is an edge view of a completed washer, on a larger scale than Figs. III and IV.

Fig. VI is a fragmentary sectional view from the rear side of the machine, taken as indicated by the line and arrows VI—VI in Fig. I.

Fig. VII is a rear view of the machine from the left of Fig. I, with certain parts cut away and removed as indicated by the line and arrows VII—VII in Fig. I, a portion of a sprocket chain being broken out and omitted.

Fig. VIII is a fragmentary view of certain machine parts shown in Fig. IV, omitting the stock and washer.

Fig. IX is a fragmentary plan view of certain parts below and adjacent an arbor around which the stock is coiled in the operation of the machine.

Fig. X is a fragmentary view of certain other parts below the arbor, partly in section, taken as indicated by the line and arrows X—X in Fig. I.

The machine hereinafter described is adapted to make circular or coiled articles from metal strip stock of any desired cross-section, including flat strip, bars or rods, or wire. It is hereinafter explained with particular reference to the manufacture of a single turn spiral of flat stock, designed for use as a lock washer.

The frame structure 10 of the machine illustrated in Fig. I includes a table or bed 11 whereon are mounted the supporting and bearing structures for various parts of the machine. Coming from any suitable supply, the metal strip stock or wire S (whereof the rings or washers are made) passes, as shown in Figs. I and II, through a guideway 12; between the peripheries of coacting feed rolls or wheels 13, 14; and through another guideway 15 to an arbor 16 and a coacting abutment 17 (shown as a roll) whereby it is coiled into circular or helical form, as shown at T, Figs. II, III and IV. From the helical coil T thus continuously produced, successive sections or turns constituting the desired rings or washers W, Fig. V, are periodically cut off by a moving cutter 20, preferably revolving constantly in proper relation to the travel of the stock S, Figs. II, III and IV. As they are thus detached, the washers W fall away, and may be received by a chute 21 (Fig. II) leading to any convenient receptacle or point of delivery, not shown.

The wire or rod stock S may be of any desired cross section; but for the production of flat washers such as shown in Fig. V, it is preferably of trapezoidal section (not shown), as well understood in the art. The guides 12 and 15 (especially the latter) should afford passages closed on all sides and of section approximately corresponding to that of the strip stock S. They should be large enough to obviate jamming or wedging of the stock in them while at the same time preventing it from buckling materially (in the guide 15) under the push of the rolls 13, 14. As shown in Figs. I, II and VI, the guides 12, 15 are secured by clamping bolts 22, 23 extending through slots in the guides, which permit lengthwise adjustment of the guides 12, 15 according to the size of the rolls 13, 14 used from time to time.

In the present instance, the rotating cutter 20 is operated directly by the main drive shaft 24 of the machine, being mounted in a diametral channel in a head 25 on one end of this shaft and adjustably held by set screws 26, 26 in a cover plate 27. The shaft 24 may be driven from any suitable source of power such as an electric motor 28 (Fig. VII) on the machine frame 10, preferably through a positive chain and sprocket drive 29. The shaft 24 may also be provided with a handwheel 30 fixed on its left-hand or rear end (Fig. I).

As shown in Figs. I, II and VI, the feed rolls 13, 14 are removably fixed on upright shafts 31, 32 which are journaled in antifriction (ball) bearings. In the present instance, only the roll 13 is positively driven, by a bevel gear 33 fast on the lower end of the shaft 31 and meshing with a bevel pinion 34 fast on a shaft 35.

The roll 14 is idle, and is adjustable transversely relative to the roll 13. For this purpose the bearings of the shaft 32 are mounted in a slide block 36 in transverse ways 37 on the table 11, and these ways are secured by screws 38 which can be tightened to clamp the slide block 36 in any position determined by an adjusting screw 39. As shown in Figs. VI and II, the peripheries of the rolls 13 and 14 are ridged axially and circumferentially, respectively, to produce corresponding ridges on the stock S as it passes between the rolls.

Shafts 35 and 31 and roll 13 may be positively driven from shaft 24, at suitable speed relative to the cutting movements of cutter 20, by means of a chain and sprocket drive 40 from shaft 24 to a countershaft 41 whereon is a toothed pinion 42 coacting with a gear 43 on shaft 35. While shafts 24 and 35 are mounted in fixed bearings on the portion 11 of the machine frame 10, the countershaft 41 is shown (Figs. I and VII) as mounted in bearings in an arm or frame 45 which is swingably mounted on the shaft 24, and can be secured in any desired angular position by a clamp bolt 46 taking into a bracket on table 11 and extending through a segmental slot 47 in arm 45. This provides for easily changing the gears 42, 43 to vary the speed of feed roll 13 relative to that of shaft 24.

The chain and gear drive just described permits faster running of the machine than would be possible with worm gearing, and is very easily and quickly changed to vary the rate of feed relative to the rate of revolution of the shaft 24 and the active movements of cutter 20. Being idle, the roll 14 can be of any desired size, and there is no problem of gearing it properly to the driven roll 13. Thus it can be made of large diameter to assure long wear, and need not be changed until worn out. The transverse ridges on the driven roll 13 assist in positively and forcibly feeding the stock S, besides producing the desired cross or radial ridges on the washers W, while the circumferential ridges on the roll 14 do not interfere with the feed in any way, and produce the desired circumferential ridges on the washers W. The circumferential ridges on the roll 14 also serve to guide the stock and prevent lateral deflection thereof as it passes between the rolls.

As shown in Figs. II, III, IV and VIII, the arbor 16 has a round (cylindrical) portion 49 around which the stock S coils, and has in its end 50 a lateral recess 51 that accommodates the end of the revolving cutter 20 as the latter moves past. The angle 52 at the top of the recess 51 affords a stationary cutting edge against which the coiled stock S is sheared by the bevel-ended cutter 20. The round portion 49 of the arbor 16 is revoluble, turning with the stock S as the latter coils around it. For very rapid operation, this is a feature of considerable importance, to prevent jamming of the stock by friction with the arbor when tightly wrapped around it. The end portion 50 of the arbor 16 does not revolve, however, and hence its cutting edge 52 and its recess 51 remain always in the proper position to coact with the cutter 20.

As shown in Fig. VIII, the part 50 is in effect an integral head on the end of a rod or shaft 53, which fits and is clamped in a cylindrical (reinforcing) holder or sleeve 54, split lengthwise on at least one side to allow it to be tightened on the shaft or vice-versa, and preferably made (Figs. VI and VIII) in diametrally divided halves. The part 49 has the character of a roller free to turn on shaft 53 between head 50 and the end of sleeve 54. Together, the parts 50 and 53, 49 and 54 form the winding arbor 16. The sleeve 54 is mounted in an eccentric bore in a round (cylindrical) block 55 that is itself mounted in a bore in a bracket 56 on the frame portion.

Ordinarily, the sleeve 54 and the block 55 are held fast (and the shaft 53 is clamped in the sleeve) by set screws 57, 58 threaded in the block and in the bracket, respectively; but when these screws are loosened, any or all the parts can be turned or moved endwise (axially), to bring the arbor 16 as a whole and the head recess 51 into proper cooperative relation to other parts, including roll 17 and cutter 20, etc. Also, shaft 53 can be removed and replaced with one having a different head 50, or roll 49 can be replaced,—whenever a change in the work to be done demands such changes of parts. As shown in Figs. I and III, the direction or line of the actual cutting motion of the cutter 20 approximates the common (vertical) plane of the axes of arbor 16 and block 55, so that there is only a small lever arm for the force tending to turn the block during cutting, and hence a relatively small turning moment.

As shown in Figs. I, II, III and IV, the roll 17 not only coacts with the arbor 16 in bending the stock S around the latter, but also contributes to the helical coiling of the stock at exactly the desired screw pitch. For this purpose, the roll 17 has a peripheral spacing flange 59 of such thickness and so located as to engage between successive stock turns or convolutions as the stock S bends and coils around the arbor 16, Fig. IV. As shown in Figs. I, II and VI, the roll 17 is revolubly mounted in the forked end of a block 60 which is pivoted at 61 on a slide block 62 mounted in guideways 63 at opposite sides of an opening in the table bracket 56. The horizontal position of the roll 17 relative to the arbor 16 can be adjusted by means of an abutment screw 65 threaded in a cross-piece 66 bolted to the bracket 56 across the guideway opening therein. By this adjustment, the distance $x$ between the ends of the washer W (Figs. III and V) can be controlled and varied as desired. The up and down position of the roll 17 relative to the arbor 16 can be adjusted by means of abutment screws 67, 67 threaded into ears or lugs on the bracket 56, so as to set the axis of roll 17 in the horizontal plane of the axis of arbor 16, or at any desired distance above it. The roll 17 is shown provided with trunnions whose bearings 68 are normally clamped in place by parts 69 bolted to the end of the block 60.

As shown in Figs. I, II, III and IX, the guideway 15 extends substantially to and under the arbor 16, where its upper portion is cut away to allow the stock S to bend upward. In front of the guide 15, directly under and engaging the turn of the coil of stock S, just behind the point of cutting, there is a support or anvil 70 (Figs. II, III, IX and X) that sustains the arbor 16 (through the intervening lower curved portion of stock S) under the downward force of the cutter 20, acting on the stock against the arbor-head-edge 52. As shown in Fig. X, the anvil 70 comprises an upright bar slidable (but anti-turningly engaged) in a vertical bore or slideway in a holder 71 which is mounted on the table 11, with provision for adjusting it backward or forward lengthwise of the arbor. For this purpose, the holder 71 has a ridge and groove engagement with the table 11 at 72, and a clamp bolt 73 extends through a slot in the table and takes into the holder. Provision is also made for adjusting the anvil 70 up and down relative to the arbor 16, by means of a supporting screw 75, threaded through the table 11 and provided with wings 76 for turning it and with a winked locknut 77. As shown in Fig. X, the screw 75 is so much larger than the lower end of the anvil 70 that the latter rests on the screw in all positions of its transverse adjustment. The upper end of the anvil 70 is preferably provided with an engagement surface 78 of very hard metal (such as a "carboloy" steel inset) to take the concentrated downward pressure from the coil of stock S resting on it.

As shown in Figs. I and II, the delivery chute 21 has a hood 80 extending over the arbor head 50, to receive the detached washers and deliver them down through the table 11 to any desired receptacle or conveyor (not shown). The hood 80 is shown as removably secured by one or more screw clamps 81, to permit its removal when desired.

A mode of operation of the machine is as follows:

The stock S is inserted in the guideway 12 and between the rolls 13, 14, which are revolved by turning the handwheel 30 to draw the stock in and push it through the guideway 15 under the arbor 16. With a suitable hand tool (not shown), the workman bends the end of the stock upward somewhat (Figs. I and II); so that as it is forced in against the roll 17 by further turning the handwheel 30, it bends upward around the arbor 16 behind the spacer flange 59. As the end of the stock S reaches and overpasses the top of the arbor, the workman readily pulls it forward, so that when it again passes under the arbor and upward against the roll 17, it is in front of the spacer flange 59. After feeding in the stock S by turning the handwheel 30 until it is properly started, as just described, the workman may start the driving motor 28, and the machine will continue to operate automatically. At each revolution of the shaft 24, the cutter 20 severs a ring or washer (of one or more convolutions) from the stock S, as already described, preferably beveling the cut ends as shown in Fig. V, to abut properly when the washer is flattened under lateral (axial) compression. Making, preferably, one cut in each revolution of shaft 24, the cutter 20 has a higher rate of revolution and linear cutting speed than if it made two cuts per revolution of shaft 24, which produces better, cleaner cuts of the high-carbon spring steel of which such washers are made.

The said George K. Garrett claimed as his invention, and desired to secure by Letters Patent of the United States:

1. In a machine of the character described, the combination of peripherally coacting driven and idle feed rolls engaging at opposite sides of a metal strip, one having its periphery transversely ridged and the other having its periphery ridged circumferentially; means for guiding and confining the strip against buckling under the push of said feeding means; an abutment in the path of said strip for bending and winding it; an arbor adjacent said abutment having a rotatable portion around which the strip coils and a fixed cutting portion; a movable cutter coacting with said cutting portion to sever sections of the coiled strip from the coil on the arbor by movements downward adjacent said cutting portion of the latter; a support engaging the strip under the arbor to sustain the latter against the downward cutting pressure; and means for adjusting said support transversely of the strip, in the direction of the arbor axis, and for also adjusting it up or down in any of its positions of transverse adjustment.

2. In a machine of the character described, the combination of means for forcibly feeding a metal strip, and for guiding and confining the strip against buckling under the push of said feeding means; an abutment in the path of said strip for bending and winding it; an arbor adjacent said abutment having a rotatable portion around which the strip coils and a fixed cutting portion beyond said rotatable portion; and a movable cutter coacting with said cutting portion to sever sections of the coiled strip.

3. In a machine of the character described, the combination of means for forcibly feeding a metal strip, and for guiding and confining the strip against buckling under the push of said feeding means; an abutment in the path of said strip for bending and winding it; a rotarily adjustable block with an eccentric bore therein; an arbor, around which the strip coils, mounted in said bore adjacent said abutment and having a cutting end portion; and a movable cutter coacting with said end portion to sever sections of the coiled strip by movements in a direction approximating the common plane of the axes of said bore and said arbor; at least said end portion of said arbor being rotarily adjustable relative to said block to bring it into proper cooperation with the cutter.

4. In a machine of the character described, the combination of means for forcibly feeding a metal strip, and for guiding and confining the strip against buckling under the push of said feeding means; an abutment in the path of said strip for bending and winding it; an arbor mounted adjacent said abutment comprising a clamping sleeve, a shaft normally clamped in said sleeve having a cutting head on its end, and a roller on said shaft between said head and said sleeve around which the strip coils; and a movable cutter coacting with said head to sever sections of the coiled strip.

5. In a machine of the character described, the combination of means for bending and coiling a forcibly fed metal strip, means for severing sections of the coiled strip, and means for forcibly feeding the strip to said bending and coiling and severing means comprising peripherally coacting driven and idle rolls engaging at opposite sides of the strip, said driven roll having its periphery transversely ridged so as to form transverse ridges on the strip, and said idle roll having its periphery circumferentially ridged so as to form longitudinal ridges on the strip and prevent lateral deflection thereof as it passes between the rolls.

6. In a machine of the character described, the combination with means for forcibly feeding a metal strip, and for guiding and confining the strip against buckling under the push of said feeding means, an abutment in the path of said strip for bending and winding it, an arbor, around which the strip coils, mounted adjacent said abutment and having a cutting portion, and a movable cutter coacting with said cutting portion to sever sections of the coiled strip from the coil on the arbor by movements downward adjacent said cutting portion of the latter; of a support engaging the strip under the arbor to sustain the latter against the downward cutting pressure, means for holding said support and guiding it for up and down movement, means for adjusting said guide means and support transversely of the strip, in the direction of the arbor axis, and separate supporting means for the aforesaid support itself adjustable up and down to raise and lower the support in said guide means, toward and from the arbor axis, while permitting the transverse adjustment of the guide means as aforesaid with the support in any position of up and down adjustment.

KATHERINE GARRETT HICKMAN,
*Administratrix of the Estate of George K. Garrett, Deceased.*